UNITED STATES PATENT OFFICE.

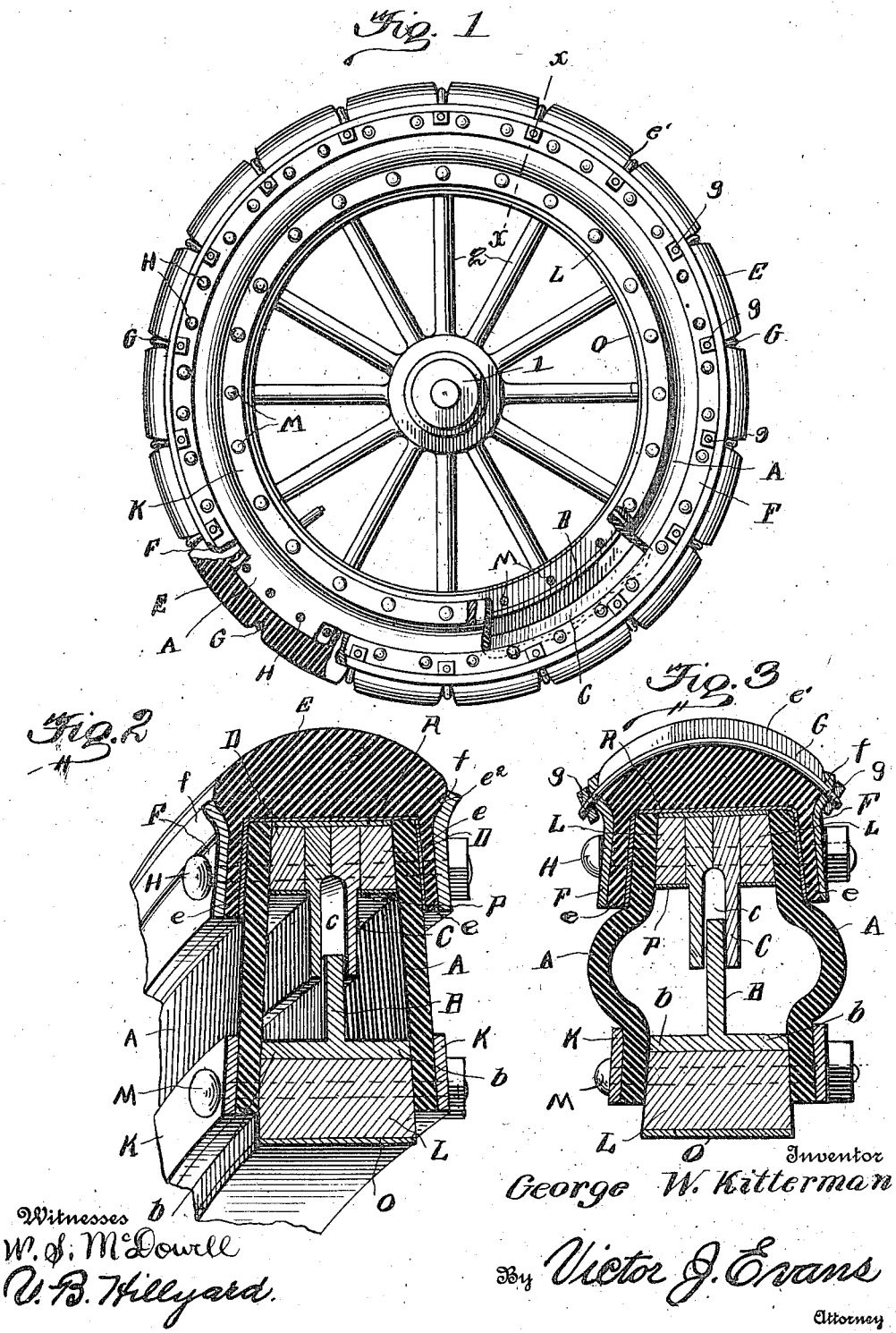

GEORGE W. KITTERMAN, OF BERWYN, ILLINOIS, ASSIGNOR OF ONE-HALF TO MILO D. MATTESON, OF CHICAGO, ILLINOIS.

TIRE.

1,014,007.  Specification of Letters Patent.  Patented Jan. 9, 1912.

Application filed October 5, 1910. Serial No. 585,452.

*To all whom it may concern:*

Be it known that I, GEORGE W. KITTERMAN, a citizen of the United States, residing at Berwyn, in the county of Cook and State of Illinois, have invented new and useful Improvements in Tires, of which the following is a specification.

The present invention has relation to tires designed most especially for automobiles and vehicles of kindred nature requiring resilient tires in order to insure comfort to the rider and relieve the vehicle of excessive shock and vibration.

The present invention provides a tire combining the qualities of a pneumatic and a cushion tire without being liable to the objection urged against the use of pneumatic tires, the present invention providing a tire which while flexible is devoid of an inner tube, said tire having a fixed tread and inner rim portions and flexible or yieldable sides, the latter yielding and being extended when the tire is inflated.

The tire comprises guide members which have connection with the tread and rim portions, thereby centralizing the strain upon the flexible sides and preventing lateral thrust producing irreparable injury to the tire when in service.

The invention further contemplates a tire comprising a number of parts which are replaceable so that in the event of injury any one of the elements may be easily and quickly substituted by other parts without necessitating the procurement of a new tire.

The invention consists of the novel features, details of construction and combination of parts, which hereinafter will be more particularly set forth, illustrated in the accompanying drawing, and pointed out in the appended claim.

Referring to the drawing, forming part of the application, Figure 1 is a side view of a vehicle wheel provided with a resilient tire embodying the invention, a portion of the tire being broken away to show the relative arrangement of the parts. Fig. 2 is a sectional perspective view of the rim portion of the wheel, showing the parts on a larger scale. Fig. 3 is a transverse section of the tire on the line $x$—$x$ of Fig. 1, showing the parts on a larger scale.

Corresponding and like parts are referred to in the following description, and indicated in all the views of the drawing, by the same reference characters.

The tire comprises a tread E, an inner rim L and flexible sides A and is fitted to a vehicle wheel comprising a hub 1 and spokes 2, the latter being secured at their outer ends to a rim or band O to which the rim L is secured in any manner.

The rim or band O is usually of metal, whereas the rim L is of wood. The tread E is of rubber or like material and formed with side flanges $e'$ which embrace the outer portions of the flexible sides A and are secured thereto. The outer surface of the tread E is convex between its sides and is provided at intervals with transverse channels $e'$ in which are fitted clips or tie bolts G, by means of which the tread E is secured when in place. The sides of the tread E are outwardly flared, as indicated at $e^2$, so as to provide an extended surface. The tread portion of the tire is substantially of U-form in cross section, the walls of the channel being lined by canvas or other textile material, whereby the tread is materially strengthened.

The flexible sides A consist of rings of rubber or other resilient material and the same are placed so as to receive the rim O between their inner edges and the parts B, C and D between their outer edges. Bands K are placed against the outer sides of the inner edge portions of the flexible sides A and bolts M pass through registering openings formed in the parts K, A and L so as to secure all together.

The flanges $e'$ of the tread portion E are confined between the flexible sides A and bands F, the latter having inclined portions $f$ which bear against and sustain the side portions $e^2$ of the tread E. The parts D preferably consist of wooden rings although said rings may be of any fibrous or cheap material. The parts P consist of bands which are placed against the inner walls of the rings D and are located upon opposite sides of the parts C. The parts C consist of metal rings, the outer portions of which are thickened and touch at their inner faces and come between the rings D, whereas their inner portions are reduced and placed apart to receive a ring B between them. Bolts H pass through the registering openings formed in the parts F, $e$, A, D and C and connect all together. The rings B and C consist of guide members which have telescopic arrangement to hold the tread portion of the tire in the plane of the wheel and prevent lateral displacement thereof when the wheel is subjected to transverse stress. The ring B forms part of the band $b$ which latter is placed against the outer side of the rim L. The inner guide member is approximately of T-form and the ring portion B thereof operates in the space $c$ formed between the inner portions of the rings C. A band R encircles the rings B and C and comes between them and the inner wall of the channel of the tread portion E.

When the parts are assembled the tire assumes the substantially as indicated in the several views and the tread portion of the tire is supported between the inclined portions $f$ of the bands F and are connected through said parts $f$ by curved bolts or fastenings G, whose ends are threaded and pass through openings formed in the parts $f$ and receive nuts $g$. After the parts are assembled the tire is inflated in the usual manner and the intermediate portions of the flexible sides A are extended and caused to bulge outwardly, as indicated most clearly in Fig. 3. By reason of the peculiar formation of the tire, the rim and tread portions are rigid and the sides are flexible and lateral displacement of tread portion is prevented by the interlocking members B and C, which have connection with respectively the rim and tread portions of the tire.

It will be understood that the tire possesses the combined advantages of pneumatic and cushion tires while at the same time it is not liable to injury from puncture or the tread meeting with a sharp object which ordinarily would pierce a pneumatic tire and render the same unserviceable for the time being. The guide members B and C, by reason of their rigid connection with the rim and tread portions of the tire, cause said parts to move relatively in the plane of the wheel and thereby prevent lateral strain which is injurious and materially shortens the life of resilient tires.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention, what I claim as new is:—

A resilient tire comprising a rim, a channel tread portion of resilient material, flexible sides having their inner portions secured against opposite sides of the rim and having their outer portions placed against the inner side walls of the tread portion, guide rings and filling rings placed between the outer portions of the flexible sides, a metal band encircling the guide and filling rings and coming between them and the inner wall of the tread portion of the tire, and forced against the inner walls of the filling rings, means for securing the parts between the side walls of the tread portion, and a guide member secured to the rim portion of the tire and arranged to operate in the space formed between the inner portions of the said guide rings.

In testimony whereof I affix my signature in presence of witnesses.

GEORGE W. KITTERMAN.

Witnesses:
  MORTON T. CULVER,
  HARRY N. CULVER,
  ROGER S. CULVER.